(12) United States Patent
McKee et al.

(10) Patent No.: US 10,729,144 B2
(45) Date of Patent: Aug. 4, 2020

(54) STEAM CONTROL SYSTEM FOR MULTIZONE OVEN

(71) Applicant: Alto-Shaam, Inc., Menomonee Falls, WI (US)

(72) Inventors: Philip R. McKee, Frisco, TX (US); Lee Thomas VanLanen, McKinney, TX (US); Jeff Maddox, Garland, TX (US)

(73) Assignee: Alto-Shaam, Inc., Menomonee Falls, WI (US)

( * ) Notice: Subject to any disclaimer, the term of this patent is extended or adjusted under 35 U.S.C. 154(b) by 345 days.

(21) Appl. No.: 15/888,669

(22) Filed: Feb. 5, 2018

(65) Prior Publication Data

US 2019/0239518 A1    Aug. 8, 2019

(51) Int. Cl.
*A21B 3/04*       (2006.01)
*F24C 15/32*      (2006.01)

(52) U.S. Cl.
CPC .............. *A21B 3/04* (2013.01); *F24C 15/322* (2013.01); *F24C 15/327* (2013.01)

(58) Field of Classification Search
CPC ... F24C 15/322; F24C 15/327; A47J 37/0641; A47J 37/0664; A47J 2027/043
See application file for complete search history.

(56) References Cited

U.S. PATENT DOCUMENTS

| | | | | |
|---|---|---|---|---|
| 5,235,903 | A * | 8/1993 | Tippmann | A21B 3/04 126/20 |
| 6,773,738 | B2 * | 8/2004 | Berger | A47J 27/04 126/20 |
| 7,060,941 | B1 * | 6/2006 | Embury | F24C 7/08 219/401 |
| 7,451,691 | B2 * | 11/2008 | Robertson | A21B 3/04 219/401 |
| 7,537,004 | B2 * | 5/2009 | Reay | F24C 15/327 126/20 |
| 8,207,477 | B2 * | 6/2012 | Embury | F24C 15/327 219/413 |
| 9,468,328 | B2 * | 10/2016 | Yang | A47J 27/04 |
| 9,565,964 | B2 * | 2/2017 | Yang | A21B 3/04 |
| 9,907,436 | B2 * | 3/2018 | Reese | A47J 39/003 |
| 10,123,556 | B2 * | 11/2018 | Distaso | F24C 15/327 |
| 2014/0083309 | A1 | 3/2014 | Reese et al. | |
| 2018/0299138 | A1 * | 10/2018 | Faraldi | F24C 15/327 |

FOREIGN PATENT DOCUMENTS

EP    1715251    10/2006
FR    2699650    6/1994

* cited by examiner

*Primary Examiner* — David J Laux
(74) *Attorney, Agent, or Firm* — Boyle Fredrickson S.C.

(57) ABSTRACT

A multi-compartment oven providing steam assisted cooking employs active venting to provide improved humidity control and reduced humidity leakage between closely adjacent compartments.

16 Claims, 10 Drawing Sheets

STEAM CONTROL SYSTEM FOR MULTIZONE OVEN

STATEMENT REGARDING FEDERALLY SPONSORED RESEARCH OR DEVELOPMENT

--

CROSS REFERENCE TO RELATED APPLICATION

--

Background of the Invention

The present invention relates to ovens for the preparation of food, and in particular, to a multi-zone oven providing independent control of the temperature and use of steam in each zone.

Combination steam and convection ovens ("combi-ovens) cook using combinations of convection and steam. In convection cooking, heated air is circulated rapidly through the cooking compartment to break up insulating, stagnant layers of air around the food, thereby increasing the rate of heat transfer. Higher velocity air typically increases the rate of heat transfer from the air to the food by further disrupting the insulating, stagnant layers of air around the food, as does striking the largest surface of the food with air delivered from in a generally perpendicular direction to the food, since perpendicular air is more disruptive to such insulating, stagnant layers of air than air gliding across the largest surface of the food. High humidity further enhances the rate of heat transfer to the food as a result of the high specific heat of water compared to dry air, and such humidity may be used at temperatures approximating the boiling point of water (often called "steam-cooking") or in a superheated state well above the boiling temperature of water (often called "combi-cooking"). Steam can also reduce water loss from the food. Combi-ovens are described, for example, in U.S. Pat. Nos. 7,307,244 and 6,188,045 assigned to the assignee of the present invention and hereby incorporated by reference.

Professional kitchens are often called upon to simultaneously prepare a wide variety of dishes, each one optimally being cooked for different periods of time at different cooking temperatures, optimally according to a schedule that enables multiple different dishes to emerge from the oven at the same time for the purpose of coordinating simultaneous delivery of a variety of "fresh out of the oven" food items to different customers at the same table. U.S. Pat. No. 9,677,774, also assigned to the assignee of the present invention and hereby incorporated by reference, describes a multi-zone convection oven that can provide independently temperature, blower speed and cook time controlled cooking cavities for this purpose.

SUMMARY OF THE INVENTION

The present invention improves over the prior art multi-zone temperature controlled ovens by providing a multi-zone oven having separate compartments which can be independently controlled both in temperature and humidity. The invention manages problems of humidity migration between compartments, in part, through the use of electronically controlled venting dependent on humidity differences between adjacent compartments. This venting also provides improved control of increases and decreases in humidity for more precise cooking.

Specifically, in one embodiment, the invention provides a multi-cavity oven having a housing defining an interior cooking volume subdivided by horizontally extending humidity barriers into multiple cooking cavities, each cooking cavity supporting different cooking temperatures, the cooking volume surrounded by insulated outer walls and at least one door that may open and close to provide access to the interior cooking volume. A steam generator system introduces steam into selective cooking cavities according to an electric signal and a set of electrically actuatable valves communicate between respective outlets in respective cooking cavities and outside air. A controller communicating with the steam generator system and the electrically actuatable valves operates the electrically actuatable valves to vent cooking cavities that do not receive steam from associated steam generators when those cooking cavities are adjacent to cooking cavities receiving steam from associated steam generators.

It is thus a feature of at least one embodiment of the invention to provide a venting-based humidity-barrier system allowing substantially different humidities to exist in closely spaced oven compartments.

The controller may not activate electrically actuatable valves associated with cooking cavities that are not adjacent to cooking cavities receiving steam.

It is thus a feature of at least one embodiment of the invention to reduce venting to conserve energy when venting is not required for humidity management or other purposes.

The outlets may join to a common discharge outlet.

It is thus a feature of at least one embodiment of the invention to channel steam to a common point for discharge in a managed location.

The common discharge outlet may join with a steam trap providing a chilled surface for condensing steam prior to exhaust of that steam into the air.

It is thus a feature of at least one embodiment of the invention to prevent the discharge of high temperature steam and/or high humidity air into the work environment.

The chilled surface of the steam trap may be a thermally conductive wall of the chamber which is opened to the air, the thermally conductive wall providing condensate to a drain conduit.

It is thus a feature of at least one embodiment of the invention to provide a simple steam trap system, for example, which can be located at an elevated position for convenient connection to the ambient air.

Each of the cavities may also include a drain port connected to a common sump positioned below a lowermost cavity of the oven and wherein the sump also receives a drain from the steam trap.

It is thus a feature of at least one embodiment of the invention to allow the steam trap to channel water to a common moisture handling sump system to prevent the need to discharge water from the oven in multiple locations.

The multi-cavity oven may further include a set of fans circulating air independently through the cooking cavities in isolation from the other cooking cavities and the outlets of the cavities may be positioned at regions of local high-pressure to provide fan assisted outflow of steam from the cavities during operation of the fans.

It is thus a feature of at least one embodiment of the invention to eliminate the need for separate fans for fan assisted air exchange.

Each cavity may further include inlet openings positioned at regions of lower pressure than the regions of local high-pressure to provide fan assisted inflow of fresh air into the cavities.

It is thus a feature of at least one embodiment of the invention to improve steam exhaust rates by promoting makeup air into the cavity.

The air inlets may communicate directly with ambient air.

It is thus a feature of at least one embodiment of the invention to prevent inadvertent humidity exchange between cavities through the air inlets.

The multi-cavity oven may provide a separate heater and a thermal sensor in each cavity and further include a controller receiving a user command to independently set temperature and humidity of the different cooking cavities.

It is thus a feature of at least one embodiment of the invention to provide a highly versatile oven offering separate temperature and humidity control in adjacent compartments.

The steam generator system may provide separate water valves for each cavity providing independent generation of steam by introducing water into the steam generator.

It is thus a feature of at least one embodiment of the invention to provide improved control of steam and humidity through both control of steam generation and exhaust by venting.

The steam generator system may introduce water against the separate heater of the cavity also used for controlling cavity temperature.

It is thus a feature of at least one embodiment of the invention to provide a humidity isolation system that can handle pressure surges from rapid action steam generation of direct heater water introduction as opposed to, for example, slower boiler-based systems.

The multi-cavity oven may also include a fan separately circulating air through each cooking cavity in isolation from the other cooking cavities wherein each fan provides a shaft communicating with a tubular water spreader rotating therewith and wherein the controller controls the water valves for introducing water into the water spreader.

It is thus a feature of at least one embodiment of the invention to provide a water distribution system operating with smaller sized, separate fans divided among cooking cavities.

The heater may provide a helical heating coil surrounding the water spreader and the water spreader may be a tube punctuated by holes distributed along an axis of the shaft and helical heating coil to receive water therefrom through holes in the walls of the water spreader for creation of steam. In one embodiment, the tubular water spreader may have a length at least three times its diameter.

It is thus a feature of at least one embodiment of the invention to minimize heat distortion and wear of heater coil by improved distribution of water evenly over the heater surface.

These particular objects and advantages may apply to only some embodiments falling within the claims and thus do not define the scope of the invention.

DETAILED DESCRIPTION OF THE PREFERRED EMBODIMENT

Figure 1:
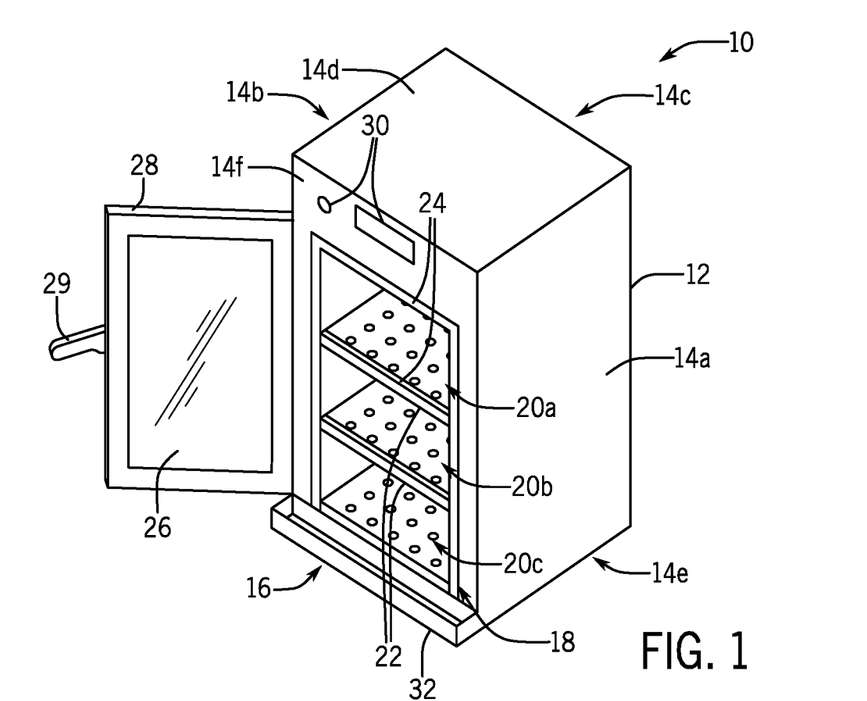
FIG. 1 is a simplified, perspective view of an oven constructed according to one embodiment of the present invention showing a cooking volume divided into cooking cavities by removable shelf assemblies.

Referring now to FIG. 1, a multi-zone steam-assisted oven 10 may provide for a housing 12 having upstanding right and left outer sidewalls 14*a* and 14*b* and upstanding rear wall 14*c* extending therebetween. These three walls 14 join generally opposed upper and lower walls 14*d* and 14*e*, the latter providing support so that the oven 10 may rest on a cart or the like (not shown).

The walls 14 enclose a generally rectangular cooking volume 16 having an opening 18 through a front wall 14*f* to provide access to the cooking volume 16 for inserting and removing food. The cooking volume 16 may be subdivided into cooking cavities 20*a*, 20*b*, and 20*c* (for example) from top to bottom, by means of shelf assemblies 22 as will be described in more detail below.

The perimeter of the opening 18 and a front edge of each shelf assembly 22 support an elastomeric gasket 24 that may seal against an inner surface of a glass panel 26 providing an inner surface of a door 28. The door 28 hinges about a vertical axis at the front edge of wall 14*b* to move between open and closed states, the latter sealing the cavities 20*a-c* with respect to the outside air and with respect to each other. The door 28 may be held in the closed state by a latch mechanism and handle 29 as is generally understood in the art. In one embodiment the glass panel 26 of the door 28 extends as a continuous surface over the openings of each of the cavities 20, however the invention also contemplates separate glass panels or suffer doors associated with each of the cavities 20.

An upper portion of the front wall 14*f* may support user controls 30 including input control such as one or more dials and output display such as an LCD display for communicating with the user. A condensation tray 32 may extend forward from a lower edge of the front wall 14*f* to catch condensation from the inner surface of the glass panel 26 when the door 28 is being opened or closed.

Figure 2:
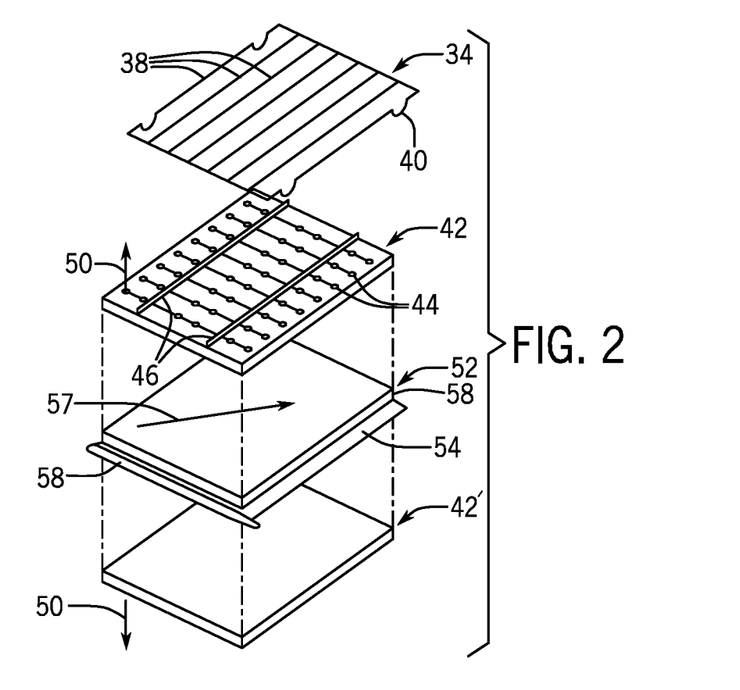
FIG. 2 is an exploded diagram of a removable shelf assembly showing a rack, a lower jet plate (for a higher cavity), a humidity wall, and an upper jet plate (for a lower cavity)
Figure 3:
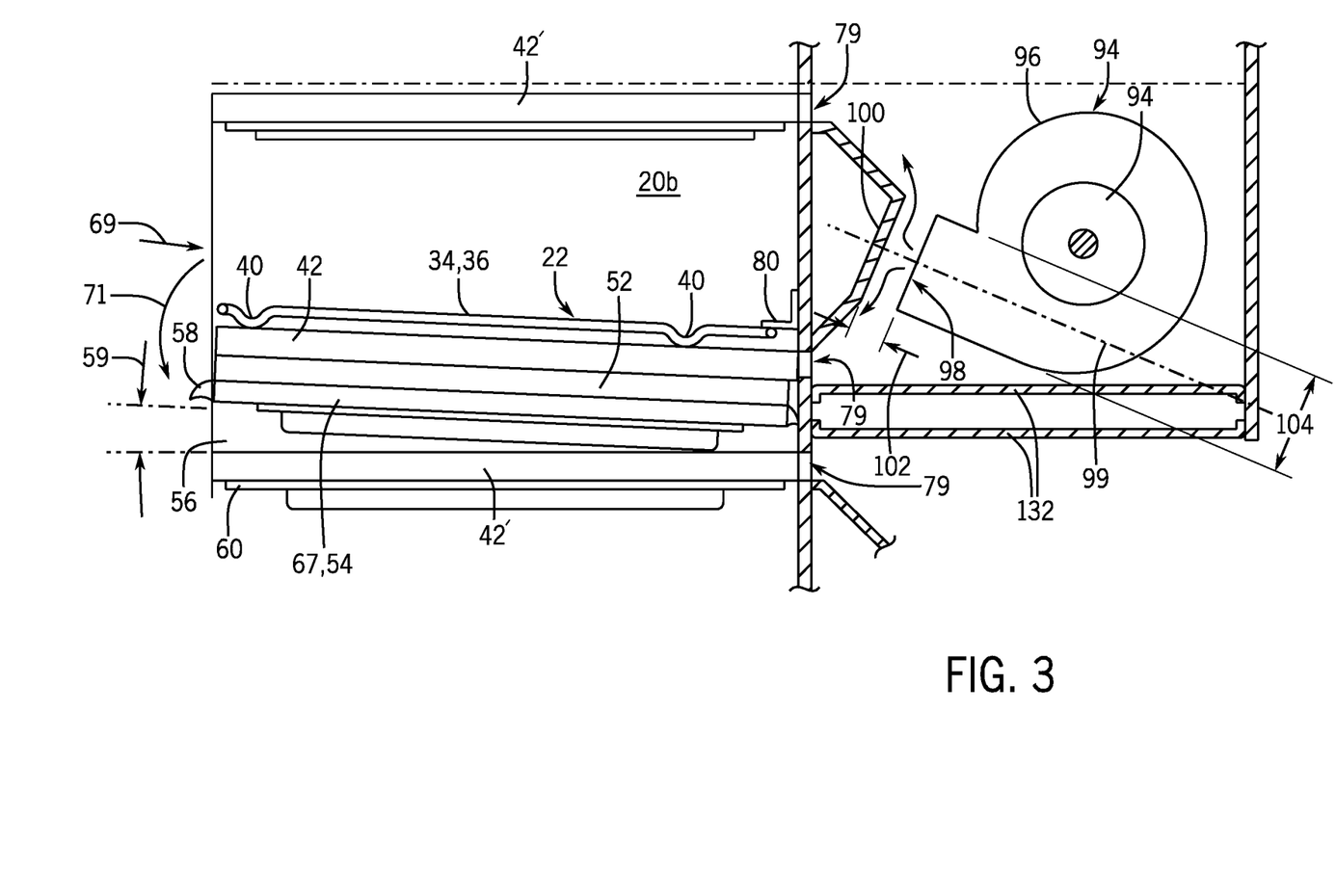
FIG. 3 is a fragmentary, elevational cross-section through one cavity of FIG. 1 showing installation of the shelf assembly followed by downward compression of the shelf assembly to provide a tight seal and showing angulation of the centrifugal fan used to provide air to the jet plates together with a high resistance baffle plate.

Referring now also to FIGS. 2 and 3, each of the shelf assemblies 22 is composed of a stack of four separately removable elements that may be inserted into the cooking volume 16 to subdivide the cooking volume 16 into cooking cavities 20 or removed to combine cooking cavities 20 into larger cooking cavities 20.

An uppermost component of the shelf assembly 22 is a wire rack 34 having an outer wire element 36 forming a generally rectangular perimeter defining an edge of the shelf assembly 22. The outer wire element 36 supports a set of parallel wire rods 38 between a front and rear edge of the wire element 36 that may support food items while allowing ample airflow therearound.

The outer wire element 36 has, in each corner, a downwardly extending foot 40 serving to support the wire rack 34 in spaced elevation above a generally rectangular and planar upper surface of a lower jet plate 42.

Figure 6:
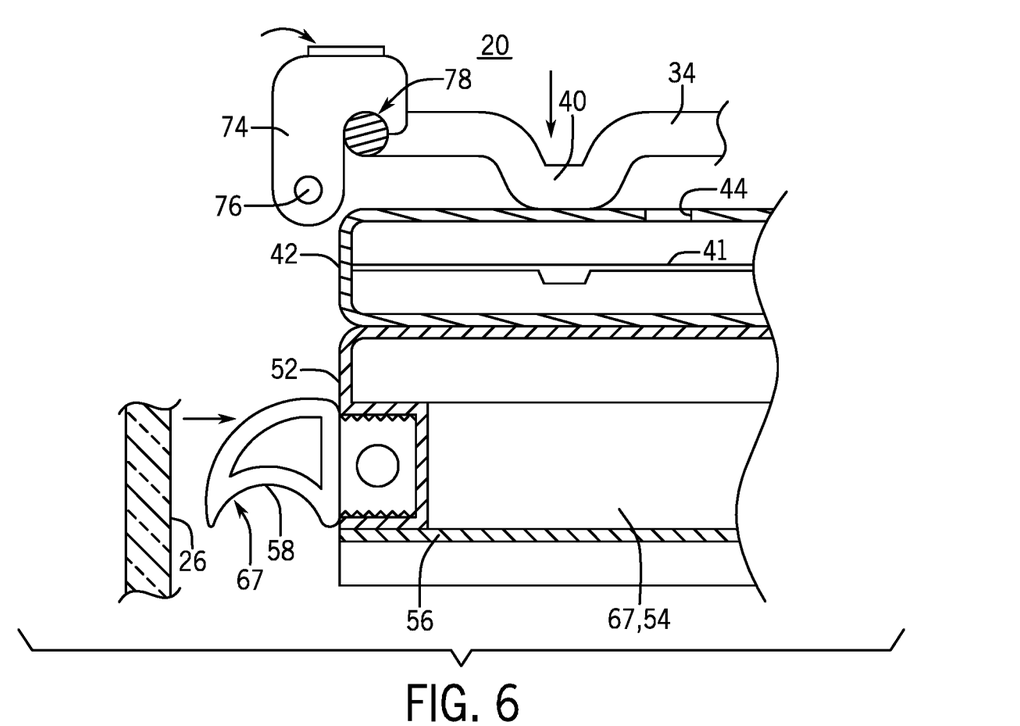
FIG. 6 is a fragmentary side elevational view in partial cross-section of a front of the shelf assembly of FIG. 1 showing a clip for sustaining a downward pressure on the shelf assembly to improve the compression of the seals on the humidity wall.

The lower jet plate 42 provides an upper surface perforated by slots and openings 44 and stiffened upwardly extending ribs 46 between a front and rear edge of the lower jet plate 42. A jet plate 42 of this general design is discussed in US patent application 2016/0356506 assigned to the assignee of the present invention and hereby incorporated by reference. As discussed in this reference, the lower jet plate 42 provides an internal channel beneath the upper surface of the jet plate 42 conducting air from a rearward opening edge of the jet plate 42 through the jet plate 42 to exit from the slots and openings 44 as a set of structured air jet 50 openings 44. Referring momentarily to FIG. 6, the jet plate 42 may include an internal horizontal baffle 41 changing the cross-sectional area of the jet plate 42 to provide more uniform airflow through the multiple openings 44. Generally, the size of the openings 44 and the cross-section of the channel within the jet plate 42 will change to promote the desired airflow pattern upward onto food supported by the rack 34.

The lower surface of the jet plate 42 in the shelf assembly 22 rests on a humidity wall 52 being a generally rectangular panel sized to extend the full lateral and front to back dimensions of the cooking volume 16 and operating to seal moisture against passage between cooking cavities 20. The lower left and right edges of the humidity wall 52 have downwardly extending elastomeric gaskets 54 that may be supported on a flange 56 extending inwardly from the inner surfaces of the left and right inner walls of the cooking volume 16. This ledge surface may be tipped from horizontal as it travels toward the rear of the cavity 20 by an angle 59 so that the upper surface of the humidity wall 52 slopes rearwardly and optionally downward from left to right as indicated by drainage arrow 57. The slope promotes water flow to a rear edge and right corner of the humidity wall 52.

A front edge and rear edge of the humidity wall 52 also support an elastomeric gasket 58 extending forward and rearward therefrom as will be discussed in greater detail below.

Positioned beneath the humidity wall 52, is an upper jet plate 42' of the next lower cavity 20. This jet plate 42' has openings 44' on its under surface to direct structured air jets 50' downwardly and may be identical in structure to jet plate 50' but simply inverted for ease in manufacturing and field use. This upper jet plate 42' may be independently supported on a ledge 60 to be removed and inserted without adjustment or removal of the rack 34, the lower jet plate 42, or humidity wall 52.

Figure 4:
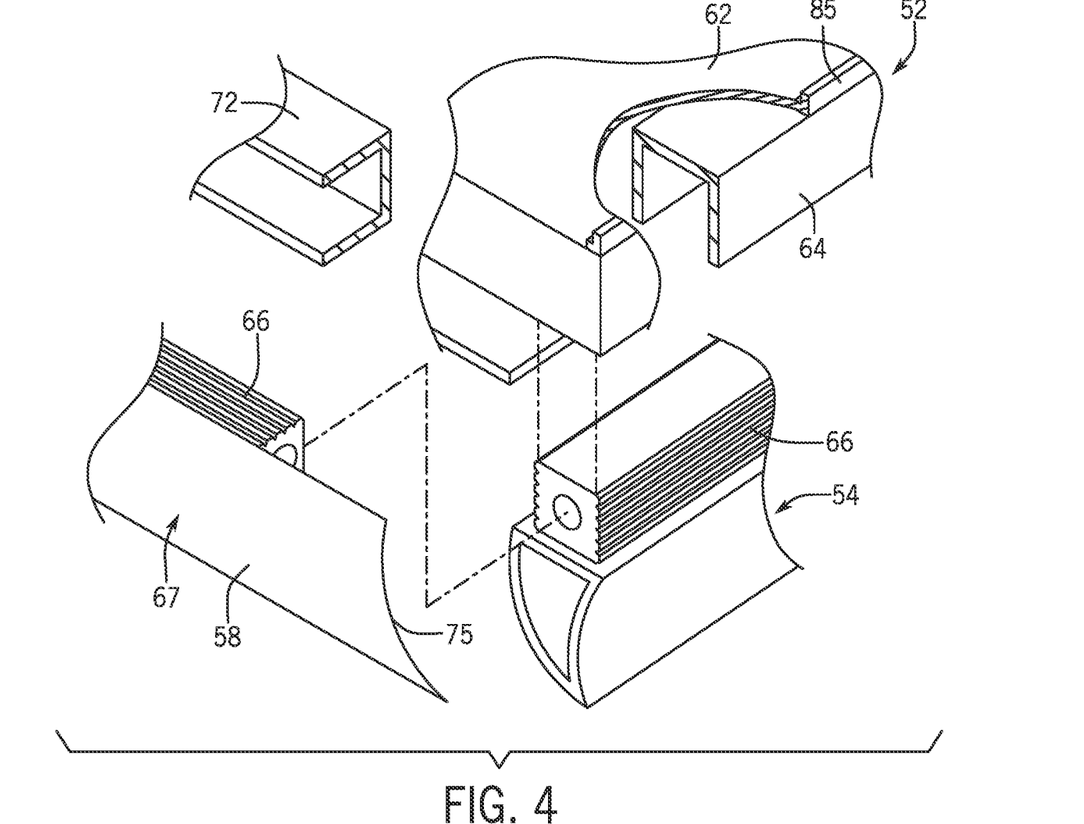
FIG. 4 is a fragmentary perspective view of a front corner of the humidity wall of FIG. 2 showing channels positioned within the humidity wall for receiving elastomeric seals.
Figure 5:
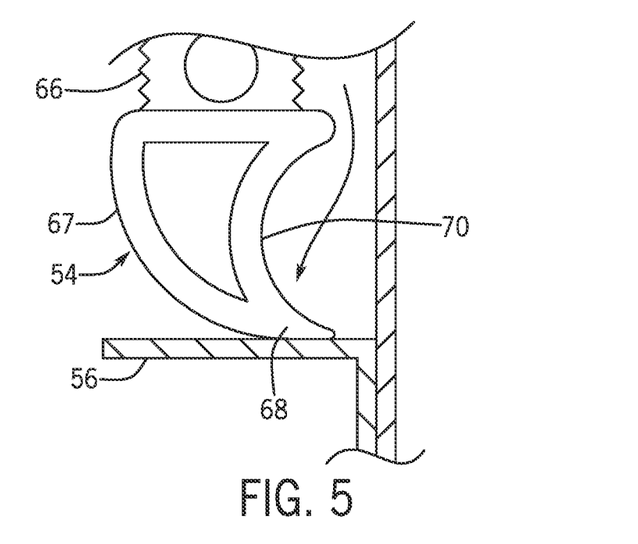
FIG. 5 is an elevational view of a side elastomeric seal of FIG. 4 showing the folding of the seal lip such as creates a concave surface whose sealing power is augmented by the pressure against which it is sealing.

Referring now to FIGS. 4 and 5, the humidity wall 52 may provide for a generally planar upper surface 62 supporting along its left and right edges downwardly opening rectangular channels 64 that may receive and retain supporting ribs 66 of the elastomeric gasket 54 therein. A sealing portion 67 of the gasket 54 may extend downwardly from the supporting ribs 66 having a lower tip 68 flexing to seal as supported against the upper edge of inwardly extending flange 56. This flexible tip 68 when compressed bends into a concave wall 70 such that over-pressure on the side of the gasket 54 facing the concave wall 70 tends to force the tip 68 into tighter engagement with the flange 56 thereby better resisting leakage against pressure spikes.

Referring again to FIG. 4, the humidity wall 52 may also support at its front and rear edges, an outwardly facing rectangular channel 72 (facing forwardly at the front edge of the humidity wall 52). Each channel 72 also receives a supporting rib 66 to provide a correspondingly extending frontmost gasket 58 with sealing portions 67 extending generally outwardly from the humidity wall 52 within the plane of gaskets 54 to complete a sealing around a periphery of the humidity wall 52 between cavities 20 and glass door surface 26.

Referring now to FIGS. 3 and 6, the wire rack 34, lower jet plate 42 and humidity wall 52 may be inserted together or individually as indicated by arrow 69 into a cooking cavity (for example, cavity 20*b*) with the front edges of the assembly slightly elevated to reduce sliding resistance to the insertion caused by friction between the gaskets 54 and the flange 56 thereby promoting easy insertion and removal. In this orientation, a rear edge of the wire rack 34 may fit beneath a capture flange 80 attached to a rear inner wall of the cooking cavity 20*b* and located to slightly compress the gasket 54 at that rear edge against the rear edge of flange 56 when the rearward gasket 58 presses against the rear horizontal ledge of the cavity 20 to seal against that surface.

The front edge of the wire rack 34, lower jet plate 42, and humidity wall 52 may then be pressed downward as indicated by arrow 71 compressing the sealing portion 67 of the gasket 54 against the flange 56 along the full length of that flange 56 to provide a good sealing engagement. Generally, the shelf assemblies 22 are intended to be installed and removed repeatedly without damage and without the need for tools.

Referring now to FIG. 6, a swivel clip 74 pivotally attached to the inner sidewalls of the cooking cavity 20 may then be pivoted about a pivot point 76 to capture a front edge of the wire rack 34 on a hook portion 78 holding the gasket sealing portion 67 in compression against the flange 56 through force exerted on that gasket 54 through the jet plate 42 and the humidity wall 52 by the captured wire rack 34.

In this position, closure of the door (shown, for example, in FIG. 6) will compress the front gasket 58 against the inner surface of the glass panel 26 completing the sealing process.

Figure 7:
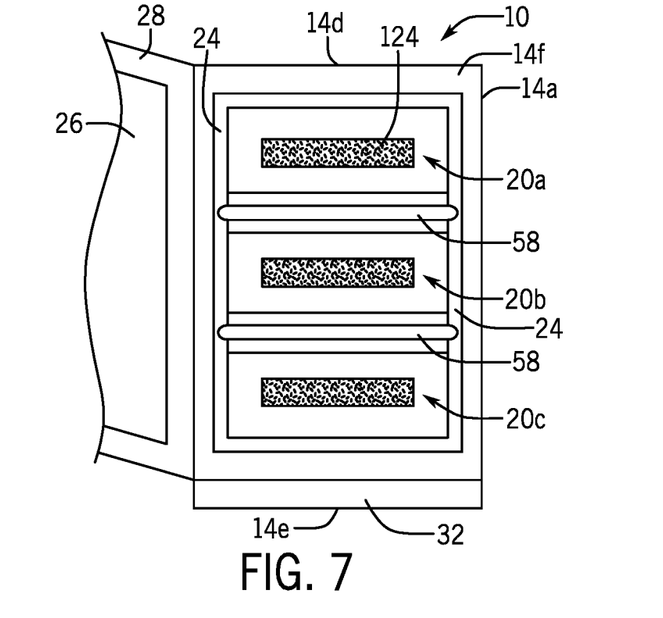
FIG. 7 is a front elevational view of the oven of FIG. 1 with the door open showing the arrangement of elastomeric seals to isolate each of the cavities.
Figure 8:
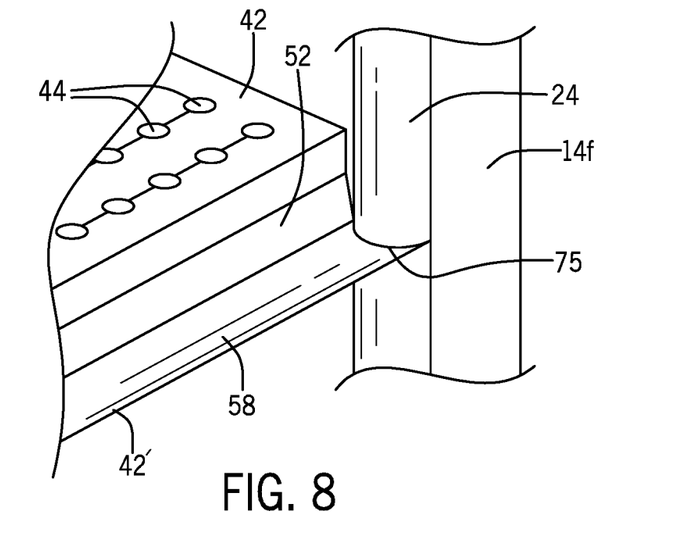
FIG. 8 is a fragmentary perspective view of a corner of the shelf assembly showing the overlap of seals supported on the humidity wall and those supported on a front surface of the opening of the oven.

Referring now to FIGS. 5, 7 and 8, the front gasket 58 may extend in cantilevered fashion away from the humidity wall 52 at its left and right sides and may be given a concave bevel cut 75 so that when the humidity wall 52 is fully seated within the oven, the front gasket 58 sealingly engages the vertical extent of the gaskets 24 attached to the front wall 14*f* on the left and right sides of the openings 18. In this way, each cooking cavity 20*a-c* provides gasketing that fully engages the glass panel 26 of the door 28 when the door 28 is closed and that fully encircles each cavity 20 preventing passage of heated air or steam between cavities 20 along the inner surface of the glass panel 26.

Figure 9:
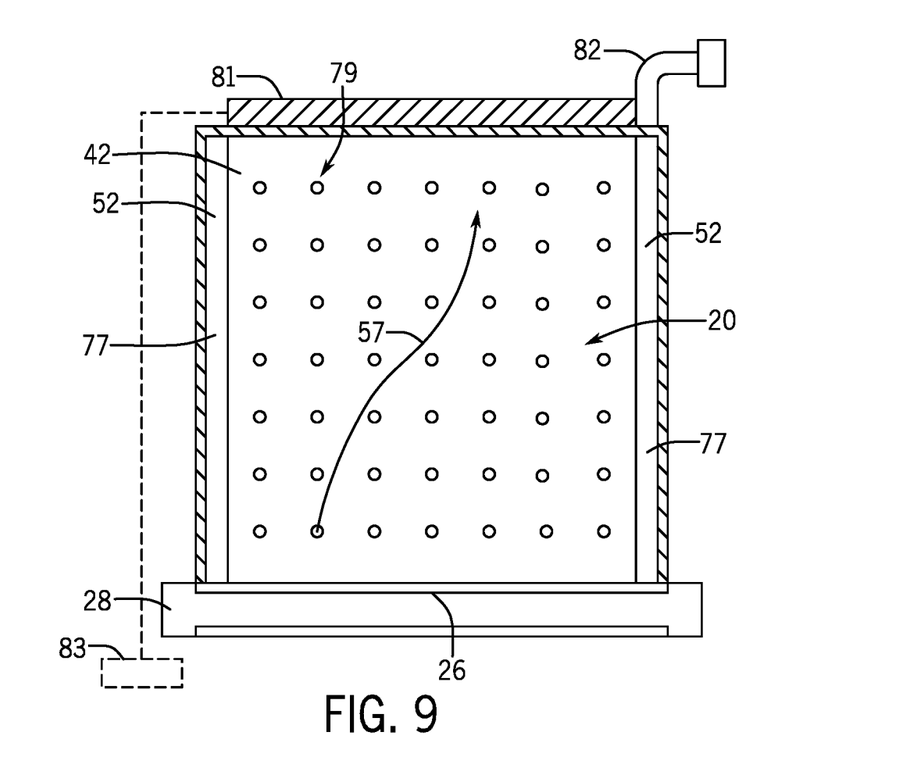
FIG. 9 is a top plan view of the shelf assembly of FIG. 1 with the wire rack removed for clarity showing the formation of channels to the left and right side of the jet plate for drainage to a drain to in a side wall or rear wall of the oven.

Referring now to FIGS. 5 and 9, when the door 28 is closed over a cooking cavity 20, the jet plate 42 is pressed rearwardly against a rear upper wall of the cooking cavity 20 to seal with air outlet openings 79 which will be discussed below. The openings 79 may be closable by a movable or slidable shutter 81 controlled, for example, by an external operator 83, as described in US patent application 2016/0356504 assigned to the assignee of the present application and hereby incorporated by reference. The shutter 81 allows a given shelf assembly 22 to be removed creating uncontrolled airflow unmoderated by a jet plate 42.

The right and left sides of the jet plate 42 in position on the humidity wall 52 will be slightly undersized to reveal small channels 77 on the left and right sides of the jet plates 42 exposing the upper surface of the humidity wall 52. These channels 77 provide for a path to conduct grease and water off of the upper surface of the jet plate 42 following a general slope of the upper surface of the humidity wall 52 indicated by arrow 57 toward a rear right corner of the cavity 20. In this regard, a small lip or slope 85 (shown in FIG. 5) may be provided on the upper surface of the humidity wall 52 to reduce flow of liquid down to the underlying gasket 54. In addition, or alternatively, the humidity wall 52 may incorporate sloped channels.

A drain tube 82 is positioned at an orifice through the rear or side wall of the cavity 20 adjacent to the drainage surface of the humidity wall 52 above the location of the rear gasket 58 and side gasket 54 to receive that drainage. In this way, the cavities 20 beneath a given cavity 20 need not be pierced to provide a path of drainage, for example, of steam, condensation, or the like.

Figure 10:
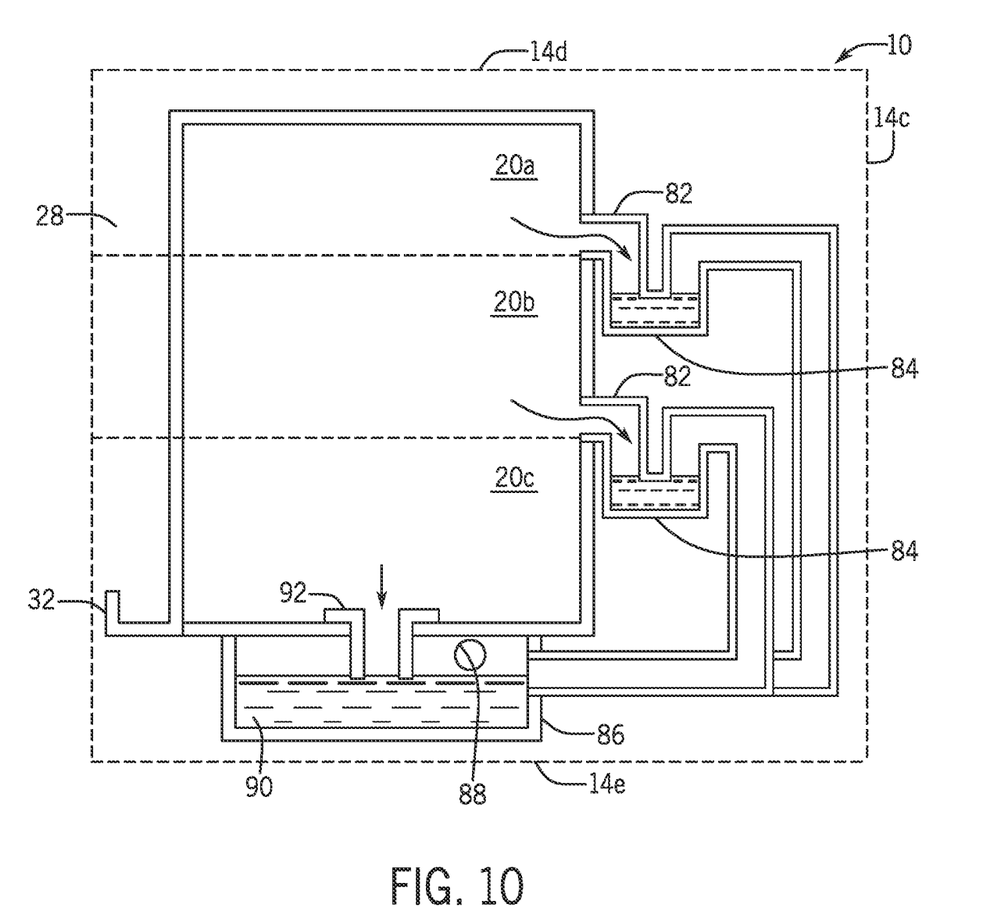
FIG. 10 is a diagrammatic front elevational cross-section showing connection of the drain tubes for multiple cavities to a common sump through back-flow restrictors preventing the circulation of steam between cavities through the drain connection.

Referring now to FIG. 10, the drain tubes 82 for cavities 20*a* and 20*b* may connect to P-traps 84 which may be partially filled with water to provide a trap preventing direct gas flow and offer a resistance to backflow that prevents steam or over-pressure gases from moving between cavities 20 instead of exiting through conduits leading to a condenser sump 86. The condenser sump 86 may be positioned below cavity 20 and may provide a direct path through exit port 88 to the atmosphere. Generally, the P-traps 84 allow for the escape of liquid as liquid fills the lower trap portion and overflows into a downwardly extending drain pipe to the condenser sump 86. In this way combined drainage to a single shared reservoir can be provided without risk of moisture passing between cavities 20 through that common connection.

The front tray 32 may also communicate with the condenser sump 86 which holds a pool of cooling water, for example, as described in U.S. Pat. No. 8,997,730 assigned to the assignee of the present invention and hereby incorporated by reference. In this regard, the condenser sump 86 may provide for a grease trap, for example using a divider wall 91 extending slightly downward into the water 90 to block the passage of grease to a water drain 93. The lowest cavity 20 does not employ a humidity wall 52 or drain tube 82 but instead provides a central tubular drain 92 extending directly down into the condenser sump 86 slightly beneath the surface of the water 90 to provide an effective trap mechanism similar to P-traps 84. It will be appreciated that other backflow limiting mechanisms may be used to prevent the interchange of gases between cavities 20 including, for example, one-way valves, resistive constrictions, and the like.

Figure 11:
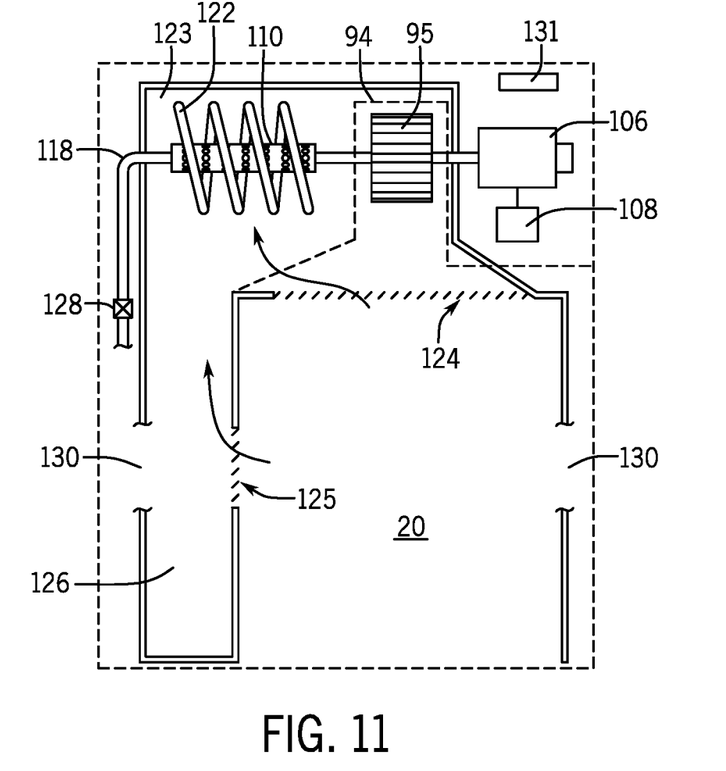
FIG. 11 is a top plan cross-section through a cavity showing the location of a fan heater assembly and steam generator associated with that cavity.

Referring now to FIGS. 3 and 11, positioned rearward from each cavity 20 is a dedicated fan 94, for example, being a centrifugal fan having a squirrel cage impeller 95 surrounded by an involute housing 96. The fans 94 may be mounted with rotation of the squirrel cage impeller 95 about a horizontal axis extending from the right to left wall of the oven 10 with the squirrel cage impeller 95 centered with respect to the volume of the cavity 20. The volume of the housing 96 may provide an opening 98 directing air along a tangent line 99 that is tipped upward with respect to horizontal by about 30 degrees allowing a larger squirrel cage impeller 95 to be fitted within the compact height dimensions of the cavity 20 while still delivering air to the upper and lower jet plates 42. A baffle plate 100 faces the opening 98 at a distance 102 less than a smallest dimension 104 of the opening 98 to provide high turbulence and high resistance to airflow that evens the distribution of airflow into the channels 79 into the upper jet plates 42' and lower jet plates 42. In this respect, the baffle plate 100 may be asymmetric about the tangent line 99 to provide desired partitioning of the airflow and also operate when cleaning solution must be distributed through the jet plates 42.

Referring to FIG. 11, each squirrel cage impeller 95 may be driven by a dedicated speed-controlled motor 106 operated by solid-state motor drive 108. The shaft connecting the motor 106 to the squirrel cage impeller 95 may continue past squirrel cage impeller 95 to a water distribution fountain tube 110 to rotate the fountain tube 110 along the same axis as rotation of the squirrel cage impeller 95 but displaced leftward therefrom.

Figure 12:
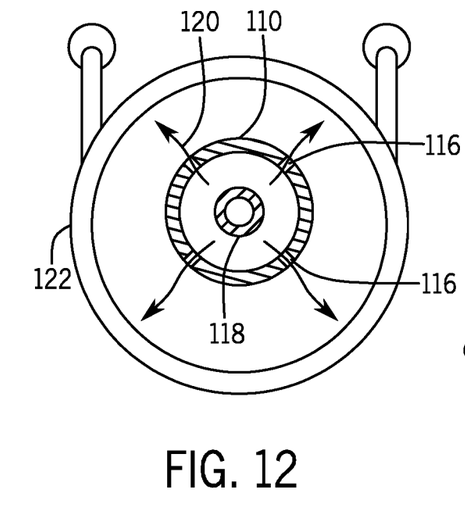
FIG. 12 is a vertical cross-sectional view through the steam generator of FIG. 11 showing distribution of water sprayed onto a helical heater coil.
Figure 13:
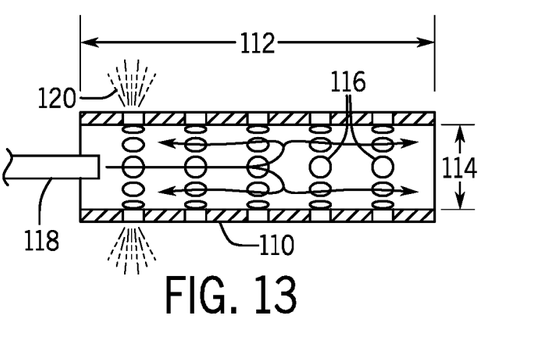
FIG. 13 is a side elevational view in cross-section of a rotating water distribution tube of FIG. 12 showing centrifugally induced migration of introduced water along the axis of the tube.

Referring also to FIGS. 12 and 13, the fountain tube 110 may be a hollow cylinder extending along a length 112 at least three times its diameter 114 and perforated with multiple holes 116 distributed along its length and around its circumference. This high aspect ratio of the fountain tube 110 allows water injected into the fountain tube 110 through freshwater port 118 to be distributed laterally along the axis of rotation of the fountain tube 110 for a substantial distance before exiting the tube in jet sprays 120. The fountain tube 110 may be placed concentrically within a helical heater tube 122 to spray water outward evenly around the inner surface of the helix and length of the heater 122. By distributing the water evenly about the inner surface of the helix of the heater 122, stress and possible damage to the heater 122 is reduced. Water to the freshwater port 118 may be controlled by electronically controlled valve 128 as will be discussed below.

Referring to FIG. 11, the helical heater tube 122 may be positioned in a side compartment 123 behind and to the left of the cavity 20 and to the left of the centrifugal fan 94 which may receive air from the side compartment 123 to be expelled through the openings 79 (for example, shown in FIG. 3) into the jet plates 42 and returned through a vent 124 at the rear of each cavity 20 and through a side vent 125 and side channel 126 to be heated by the heater 122.

Passive insulation such as fiberglass 130 may surround the outside of the side channel 126 and be positioned between the motor 106 and the fan 94 and over the rear walls of side compartment 123 and right-side walls of cavity 20. The insulation between the fan 94 and the motor 106 provides the motor 106 with a heat-isolated environment which may be vented by a vent fan 131 or the like.

Referring again to FIG. 3, a double wall 132, for example, made of metal, may be positioned above and or below the fan 94 side compartment 123 and the side channel 126 to reduce the leakage of heat between circulating air of vertically adjacent cavities 20. Optionally, the space between this double wall 132 may be filled with a passive insulator such as fiberglass.

Figure 14:
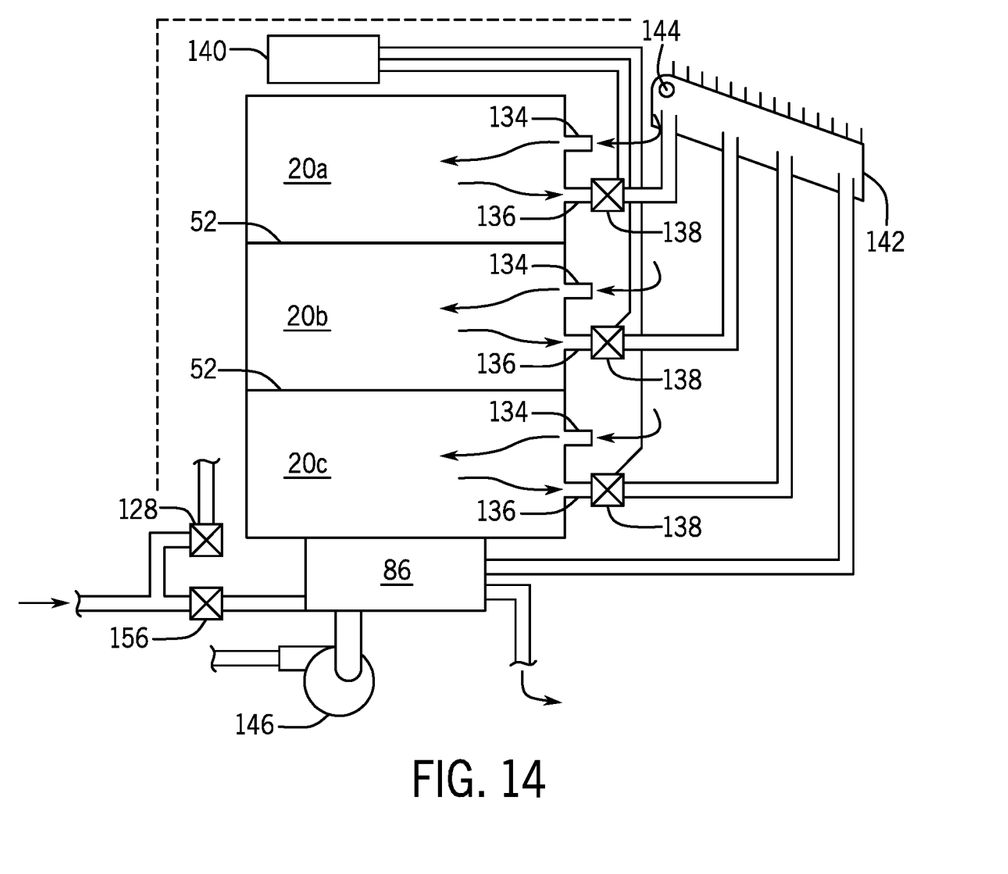
FIG. 14 is a figure similar to that of FIG. 10 showing a diagrammatic connection of inlet and outlet ports to each cavity and a steam condenser unit, the latter providing for low back pressure.

Referring now to FIG. 14, each of the cavities 20 may provide for a fresh air inlet port 134 and an outlet port 136 leading between the cavity 20 and ambient air. Generally the fresh air inlet ports 134 may be separated so that there is no tendency for steam or humidity to be able to communicate through the fresh airports between cavities 20 without substantial dilution by ambient air. Either the inlet port 134 or the outlet port 136 (in this this case the outlet port 136) may pass through an electronically controlled valve 138 controlled by a controller 140 so that exchange of fresh air or exhausted steam from each cavity 20 may be separately controlled. Steam exhausted through valves 138 may pass upward to a condenser 142 having a cooling surface condensing steam before venting the steam through an opening 144 to the atmosphere. Condensate passes downward along a sloped upper wall of the condenser 142 to be received in the condenser sump 86 described above.

Figure 15:
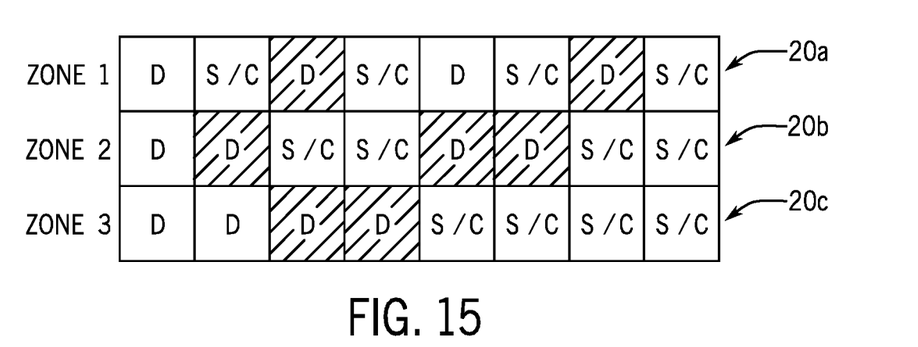
FIG. 15 is a chart showing operation of a program in the controller for controlling electric valves on the outlet ports of FIG. 15 according to the cooking schedules of adjacent cavities.

Referring now also to FIG. 15, the controller 140 may execute a control program controlling the cooking in each of the cavities including temperature and humidity as a function of time. In this regard, the controller 140 may identify which of the cavities 20 is associated with steam generation and may control the valve 128 discussed above with respect to FIG. 11 in a pulsed manner to create steam.

When one or more of the cavities 20 is providing steam-augmented cooking (either steam or combi cooking), the controller 140 may control the valves 138 to open the valves 138 associated with any cavity 20 having dry cooking (D) when it is adjacent to a cavity 20 having steam or combi-heating (S/C). This control of the valves 138 scavenges any moisture leaking through the humidity walls 52 into the dry cooking cavities 20. Those cavities 20 using steam or combi-cooking normally have their valves 138 closed during that steam application. This is also true for cavities 20 having dry cooking when there is no adjacent steam cooking cavity. Thus, for example, looking at the third column of FIG. 15, if cavity 20b is cooking with steam, and cavities 20a and 20c are cooking dry, the valves 138 of cavities 20a and 20c may be opened during the cooking process, or periodically, to expel moisture. This active approach to humidity control augments the sealing of the humidity walls 52. It will be appreciated that this active venting may be alternatively limited to times of actual steam generation that produce pressure spikes or may be limited to times when two adjacent cavities are both generating steam and not when a single cavity is generating steam.

Figure 16:
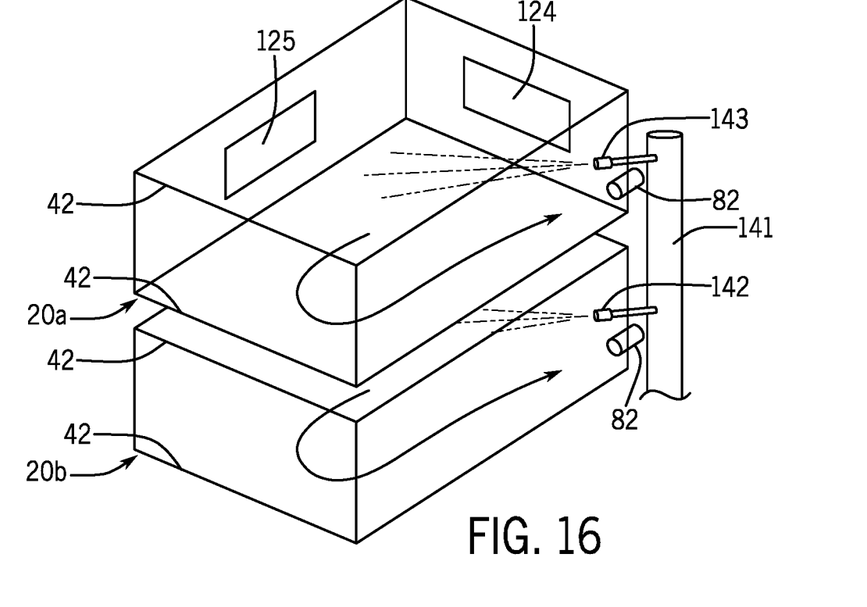
FIG. 16 is a phantom view of two cooking cavities showing a manifold for delivering cleaning fluid to those cooking cavities.

Referring now to FIGS. 14 and 16, a cleaning of the cavities 20 may be provided through the use of a cleaning manifold 141 extending vertically along a rear corner of the cooking cavities 20, for example, adjacent to the drain tubes 82 and providing nozzles 143 extending into the cavities 20 from vertical sidewalls of the cavities 20 to direct a spray of water away from the drain tubes 82 against exposed surfaces of the cavities 20. Water from those surfaces is then drawn into the vents 125 and 124 for circulation by the fan 94 and possible heating by the heater 122 and through the interior of the jet plates 42. Excess water is collected by the drain tubes 82 and provided to the sump 86 where, as activated by the controller 140, a pump 146 (shown in FIG. 17) may pump water back through the manifold 141 for constant recirculation. In this process, a cleaning surfactant or the like may be introduced into the water for improved cleaning ability. Generally, the surface of the jet plates 42 or the channels 77 described above with respect to FIG. 9 may sloped downwardly toward the drain ports 82 to provide complete drainage of the cavities 20.

Multiple such manifolds 141 may be provided to ensure complete coverage of the cavities. In one embodiment, a second manifold 141' may pass into the air channels communicating between the cavity 20 and the blower 95 (shown in FIG. 11) to introduce additional water into these areas for heating and circulation by the fan.

Figure 17:
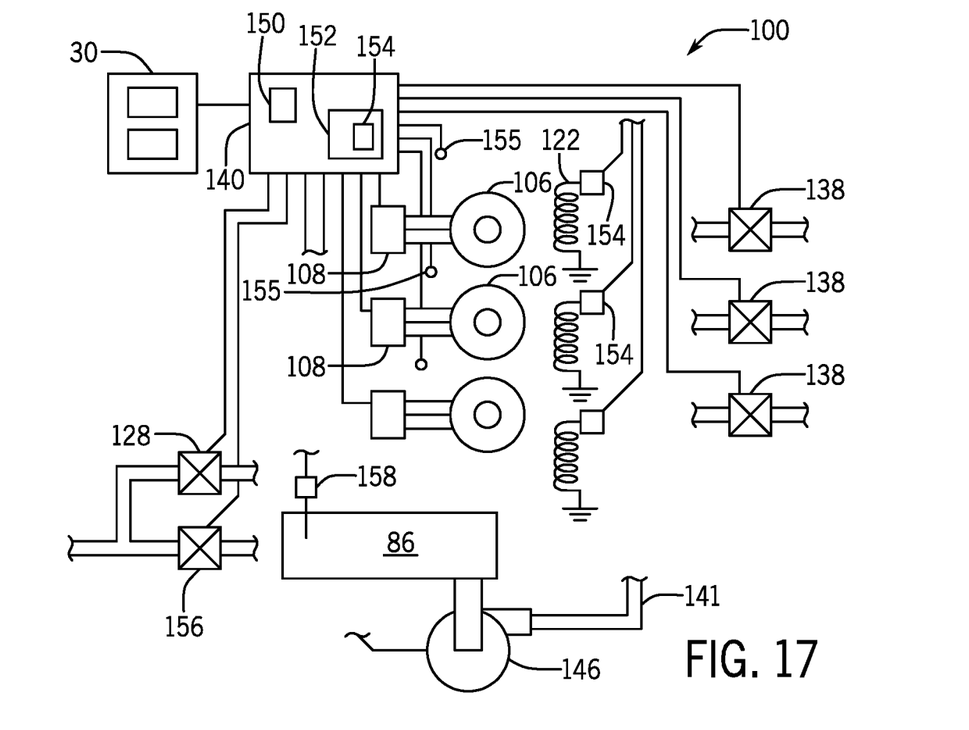
FIG. 17 is a simplified electrical block diagram of a control system of the oven of FIG. 1.

Referring now to FIG. 17, the controller 140 may provide for a microprocessor 150 communicating with a memory 152 holding a stored program executed by the microprocessor 150 for the control of the oven as discussed herein and generally to allow independent temperature and humidity control of each cavity 20 according to predefined schedules. In this regard, the controller 140 may receive input signals from user controls 30 (also shown in FIG. 1), the latter, for example, providing information designating whether steam or combi cooking will be used in each cavity 20, and may provide control signals to each of the valves 138 discussed above. and Generally, for each cavity 20, the controller 140 will also communicate with the motor drives 108 associated with each motor 106 for control of motor speed and direction as desired based on these user inputs and or a cooking schedule. The controller 140 may also received signals from temperature sensors 155 in each cavity 20 and control signals may be received from the controller 140 by solid-state relays 154 controlling power to the helical heater tube 122 when the heaters are resistance heater coils such as "cal" rods or by corresponding gas valves and gas burner assemblies when the heaters are gas heaters in response to those signals and a cooking schedule and/or use set temperature.

Controller 140 also provides a control signal to the freshwater valve 128 discussed above with respect to introducing water to the helical heater tube 122 to create steam. The controller 140 also controls a freshwater valve 156 providing makeup water to the sump 86, for example, by monitoring the signal of a temperature probe 158 measuring the temperature of that water. In this regard, the controller 140 may add additional water to the sump 86 when the temperature of the water in that sump rises beyond a predetermined level allowing excess heated water to overflow through a drain pipe. The controller 140 also controls the pump 146 to affect the cleaning process described with respect to FIG. 15 by pumping water and cleaning solution through the manifold 141 to recycle back down to the drains into the sump 86.

The controller 140 may also adjust a control strategy upon the removal of a shelf assembly 22, for example, by combining readings of associated temperature sensors 155 of the combined cavity 20, for example, by using to an average reading or selecting a maximum reading among temperature probes. In addition, the controller 140 may control fan speed for the two fans 94 of the combined cavity 20 to coordinate the operation of those fans 94 to accommodate the different airflow patterns associated with larger cavities. This is described generally in US patent application 2017/0211819 assigned to the assignee of the present application and hereby incorporated by reference. Significantly, in the present invention, when cooking cavities 20 are combined, the generation of steam as described above may be coordinated between the two different helical heater tubes 122, for example, using only one heater 122 for the combined cavities to reduce excess moisture and using the remaining heater 122 to provide improved heat recovery or alternatively alternating between the heaters 122 when steam is generated to reduce scaling buildup and the like. Under this coordination, the generation of steam or the control of heat or the control of venting is no longer independent for the steam generators, heaters, or vents of the combined cooking cavity 20.

Figure 18:
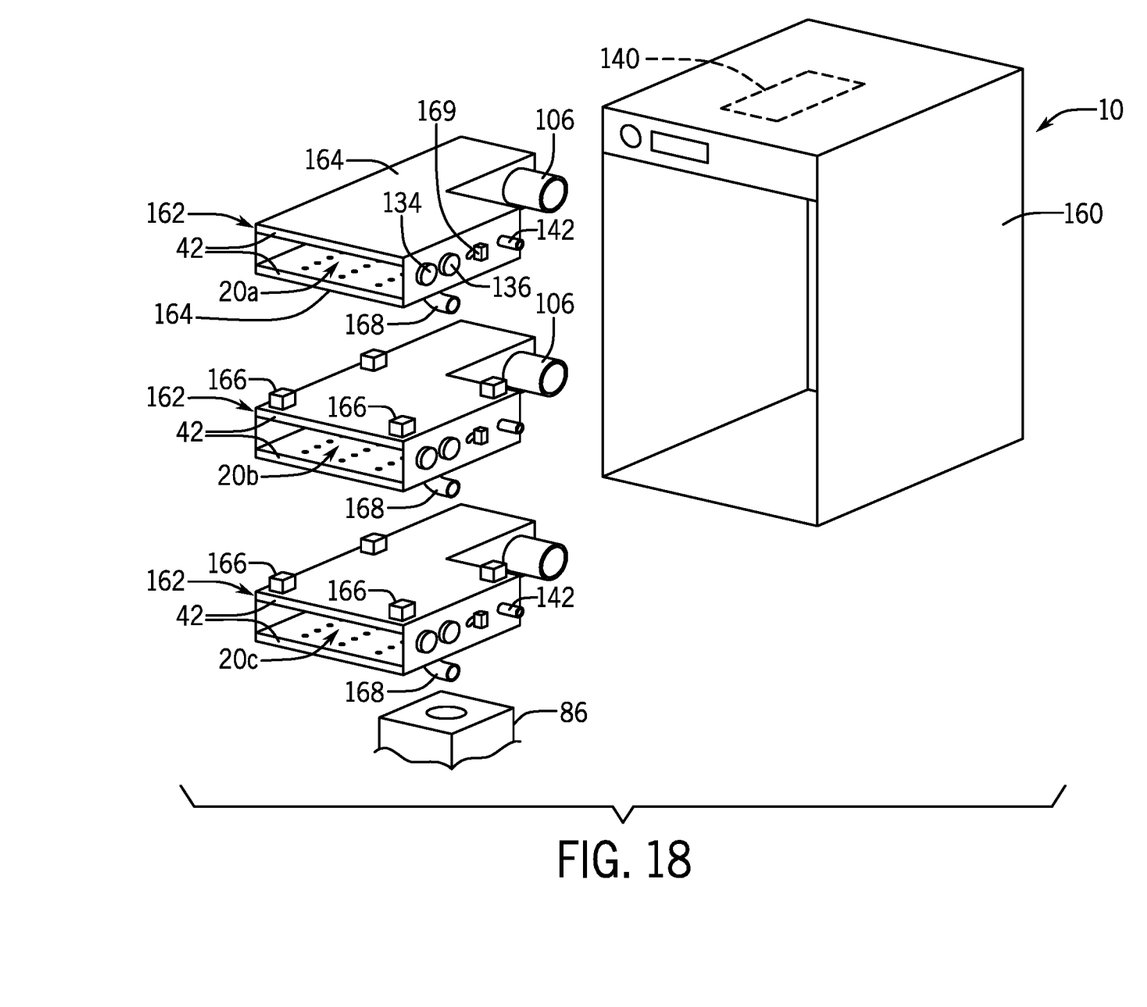
FIG. 18 is an exploded perspective view of an alternative embodiment of the present invention employing self-contained modular cavities without removable humidity walls.

Referring now to FIG. 18, many of the above-described inventive features may be applied to an alternative design of the oven 10 providing an outer cabinet 160 for supporting and receiving multiple independent oven modules 162. Each oven module 162 provides a separate housing supporting upper and lower jet plates 42 to independently implement cavities 20a-20c. Notably, the oven modules 162 do not have removable humidity walls 52 which are replaced by nonremovable upper and lower walls 164 of each oven module 162. Modules 162 may be stacked on each other as separated by spacers 166 providing exit room for a drain tube 168 serving the same function as drain tube 82 described above but being arbitrarily positioned, for example, central to the bottom wall 164. The drain tubes 168 may be interconnected by P-traps 84 to a common sump 86 has shown for example in FIG. 2. The cabinet 160 may provide for a manifold that may connect each of the drain tubes 168 to the necessary P-trap 84 and shared sump 86.

Each of the modules 162 may have a self-contained and independently operable helical heater tube 122, fan 94, motor 106, and temperature sensor 155 (for example, seen in FIG. 16) and may provide for a harness 169 allowing electrical connection to a central controller 140 in the cabinet 160 when the modules 162 are assembled therein. Similarly, each oven module 162 may have a nozzle 143 that may be connected to a manifold 141 (shown in FIG. 15) associated with the cabinet 160 and inlet port 134 and outlet port 136, one of which may connect to a valve 138 described above with respect to FIG. 14.

By using this modular approach, different size ovens can be readily created by insertion of different numbers of modules into an appropriately sized cabinet 160.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

The invention claimed is:

1. A multi-cavity oven comprising:
   a housing defining an interior cooking volume subdivided by horizontally extending humidity barriers into multiple cooking cavities, each cooking cavity supporting different cooking temperatures, the cooking volume surrounded by insulated outer walls and at least one door that may open and close to provide access to the interior cooking volume;
   at least one steam generator having a water source and a heater adapted to heat the water to produce steam, the at least one steam generator introducing steam into selective cooking cavities according to an electric signal; and
   a set of electrically actuatable valves communicating between respective outlets in respective cooking cavities and outside air; and
   further including a controller communicating with the steam generator and the electrically actuatable valves to operate the electrically actuatable valves to vent cooking cavities that are not receiving steam from associated steam generators when those cooking cavities are adjacent to cooking cavities receiving steam from associated steam generators.

2. The multi-cavity oven of claim 1 wherein the controller does not activate the electrically actuatable valves associated with cooking cavities that are not adjacent to cooking cavities receiving steam.

3. The multi-cavity oven of claim 1 wherein the outlets join to a common discharge outlet.

4. The multi-cavity oven of claim 3 wherein the common discharge outlet joins with a steam trap providing a chilled surface for condensing steam.

5. The multi-cavity oven of claim 4 wherein the chilled surface is a thermally conductive wall of the steam trap which is opened to the air, the thermally conductive wall providing condensate to a drain conduit.

6. The multi-cavity oven of claim 5 wherein each of the cavities also includes a drain port connected to a common sump positioned below a lowermost cavity of the oven and wherein the common sump also receives a drain from the steam trap.

7. The multi-cavity oven of claim 1 further including a set of fans circulating air independently through the cooking cavities in isolation from the other cooking cavities and wherein the outlets of the cavities are positioned at regions of local high-pressure to provide fan assisted outflow of steam from the cavities during operation of the set of fans.

8. The multi-cavity oven of claim 7 wherein each cavity further includes an inlet opening positioned at regions of lower pressure than the regions of local high-pressure to provide fan assisted inflow of fresh air into the cavities.

9. The multi-cavity oven of claim 7 wherein the air inlets separately communicate with ambient air.

10. The multi-cavity oven of claim 1 further including a thermal sensor in each cavity and further including a controller receiving a user command to independently set temperature and humidity of the different cavities.

11. The multi-cavity oven of claim 10 wherein the steam generator provides separate water valves for each cavity providing independent generation of steam by introducing water into the steam generator.

12. The multi-cavity oven of claim 11 wherein the steam generator introduces water against the separate heater also used for controlling cavity temperature.

13. The multi-cavity oven of claim 12 wherein each cavity also includes a fan separately circulating air through each cooking cavity in isolation from the other cooking cavities and wherein each fan provides a shaft communicating with a tubular water spreader rotating therewith and wherein the controller controls the water valves for introducing water into the water spreader.

14. The multi-cavity oven of claim 13 wherein the heater provides a helical heating coil surrounding the water spreader and wherein the water spreader is a tube punctuated by holes distributed along an axis of the shaft and helical heating coil to receive water therefrom through holes in the walls of the water spreader for creation of steam.

15. The multi-cavity oven of claim 14 wherein the tubular water spreader has a length at least three times its diameter.

16. The multi-cavity oven of claim 1 wherein each of the cooking cavities is a module providing independent upper and lower walls, wherein the modules are adapted to be received within a common cabinet having a single door.

* * * * *